United States Patent
Harr

(10) Patent No.: US 6,437,954 B1
(45) Date of Patent: Aug. 20, 2002

(54) RESIDUAL CURRENT DEVICE

(75) Inventor: Dieter Harr, Regensburg (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/485,740

(22) PCT Filed: Aug. 3, 1998

(86) PCT No.: PCT/DE98/02215

§ 371 (c)(1),
(2), (4) Date: May 4, 2000

(87) PCT Pub. No.: WO99/09629

PCT Pub. Date: Feb. 25, 1999

(30) Foreign Application Priority Data

Aug. 14, 1997 (DE) .......................... 197 35 412

(51) Int. Cl.⁷ .............................. H02H 3/33; H02H 3/16
(52) U.S. Cl. .......................... 361/45; 361/42; 361/92.1; 361/93.6
(58) Field of Search .......................... 361/93.1, 42, 45, 361/47, 49, 93.5, 93.6, 94

(56) References Cited

U.S. PATENT DOCUMENTS

| | | | | |
|---|---|---|---|---|
| 4,663,690 A | * | 5/1987 | Bonniau et al. | 361/44 |
| 5,195,008 A | * | 3/1993 | Harr | 361/42 |
| 5,596,472 A | * | 1/1997 | Roehl | 361/93.1 |
| 5,668,692 A | * | 9/1997 | Rodgers et al. | 361/93.1 |
| 5,737,167 A | * | 4/1998 | Bachl | 361/79 |
| 5,825,602 A | * | 10/1998 | Tosaka et al. | 361/94 |
| 5,835,321 A | * | 11/1998 | Elms et al. | 361/45 |
| 5,847,913 A | * | 12/1998 | Turner et al. | 361/93.1 |
| 6,094,329 A | * | 7/2000 | Heinz et al. | 361/42 |

FOREIGN PATENT DOCUMENTS

| | | |
|---|---|---|
| DE | 37 18 183 | 12/1988 |
| DE | 38 23 099 | 1/1990 |
| DE | 41 12 169 | 10/1992 |
| EP | 0 349 880 | * 1/1990 |
| EP | 0 440 835 | 8/1991 |

OTHER PUBLICATIONS

Solleder, "Warum Fehlerstrom–Schutzschalter mit netzspannungsunabhängiger Auslösung", Etz, vol. 107 (1986), Issue 20, pp. 938–945**.
Holzer, "Fehlerstrom–Schutzschalter für selektives Abschalten", Siemens Journal, Year 42, Issue 6, 1968, pp. 492–494**.
Solleder, "Allstromsensitive Fehlerstrom–Schutzeinrichtung für Industrieanwendung", Etz, vol. 115, 1994, Issue 16, pp. 896–901**.

* cited by examiner

Primary Examiner—Kim Huynh
(74) Attorney, Agent, or Firm—Harness, Dickey & Pierce, P.L.C.

(57) ABSTRACT

A residual current device includes a first delayed-tripping fault-current tripping circuit for alternating and pulsed fault current, and a second fault-current tripping circuit for direct fault current, which are connected in parallel with one another to a control line of a release for a circuit breaker, with first decoupling circuit being provided for electronic decoupling of the first fault-current tripping circuit from the control line.

18 Claims, 3 Drawing Sheets

RESIDUAL CURRENT DEVICE

FIELD OF THE INVENTION

The present invention relates to a residual current device.

BACKGROUND INFORMATION

A residual current device is used to ensure protection against any dangerous fault current in a electrical system. Such a fault current occurs when a live conductor part makes electrical contact with ground. This occurs, for example, when someone touches a live part of an electrical system or an insulation fault occurs in the system. The fault current then flows via the person, as a body current, and in the system as a fault current, to earth. The residual current device which is used for protection against dangerous body currents must then reliably and quickly isolate the electrical system from the mains power supply in the event of a fault current which is greater than the rated fault current, for example 30 mA for personnel protection and 200 mA for system protection.

A residual current device is described in, for example, "etz" Volume 107 (1986), Issue 20, pages 938 to 945. There, FIGS. 1 to 3, in particular, show outline circuit diagrams and functional principles of a residual current device. A distinction is in this case drawn between two different fundamental types. A FI circuit breaker, which is also referred to as a fault-current circuit breaker, is a fault-current protective device in which the electrical power required for the switching process is obtained from the fault current itself, irrespective of the mains voltage. A so-called differential-current DI protective circuit breaker is, in contrast, a fault-current protective device in which the auxiliary electrical energy required for the switching process is taken from the mains power supply. Such a DI circuit breaker thus requires a mains connection and a power supply unit to operate it, with the power supply unit converting the mains voltage into the supply voltage required to operate its components.

While, by virtue of the principle of their design, FI circuit breakers can trip the circuit breaker only in the event of an alternating or pulsed fault current, it is in principle possible, by using the DI circuit breaker, to detect a direct fault current and to use this to trip a circuit breaker. By using a combination of an FI circuit breaker and a DI circuit breaker, it is thus in principle possible to monitor an electrical system both for a direct fault current and for an alternating or pulsed fault current. The basic circuit diagram of such a so-called all-current-sensitive residual current device is described, for example, in "etz", Volume 115, 1994, Issue 16, pages 896–901. FIG. 2 in that document shows a release for the mechanism of a circuit breaker being connected both to a fault-current tripping circuit for alternating and pulsed fault current, and to a fault-current tripping circuit for direct fault current.

European Patent No. 0 440 835 also describes a combination of a DI circuit breaker and an FI circuit breaker. The DI circuit breaker which is intended there to be combined with the FI circuit breaker comprises a secondary winding (which is pre-magnetized with a frequency generator) of a core-balance current transformer, in which case a device for balancing the signal curves emitted from the frequency generator is connected between the frequency generator and the secondary winding.

However, such a combination is not without its problems when so-called delayed-tripping FI circuit breakers are intended to be combined with a DI circuit breaker for direct fault current. A delayed-tripping FI circuit breaker is used in order to reduce spurious tripping due to switching spikes or lightning, or in order to allow selective disconnection of parts of the system. Such a delayed-tripping FI circuit breaker, which is resistant to surge currents, is explained in more detail, for example, in the "Siemens Journal", Year 42, Issue 6, 1968, pages 492 to 494. This conventional FI circuit breaker is provided, in the secondary circuit, with a rectifier and a capacitor which is connected in parallel with the release and produces the tripping delay. This capacitor connected in parallel with the release would be charged when a fault-current tripping circuit (connected in parallel with it) of a DI circuit breaker responded and applied current to the release, so that the tripping time would be extended in the event of a smooth direct fault current. In consequence, it is not possible to comply overall and in accordance with the regulations (VDE, ÖVE, EN, IEC) with the required tripping delays for alternating, pulsed and smooth-direct fault currents.

A device for protecting against fault currents is described in German Patent No. 38 23 099. The device described operates with a first sub-device which is independent of the mains voltage, and with a second sub-device which is dependent on the mains voltage. A capacitor is arranged in series with a tripping relay in the first sub-device in order to tune to resonance for the fault-current evaluation. The second sub-device is arranged in parallel with the first sub-device as was as the capacitor, for resonance tuning.

Decoupling two parallel measurement channels is described in German Patent No. 37 18 183.

SUMMARY

An object of the present invention is to provide a residual current device in which, in particular, a delayed-tripping fault-current tripping circuit for pulsed or alternating current can be combined with a fault-current tripping circuit for direct fault current, without the tripping times and currents influencing one another.

The residual current device according to the present invention provides a delayed-tripping first fault-current tripping circuit for alternating and pulsed fault current, and a second fault-current tripping circuit for direct fault current, which are connected in parallel with one another to the control line of a release for a circuit breaker, with a first means being provided for electronic decoupling of the first fault-current tripping circuit from the control line. As a result of this electronic decoupling, tripping times and tripping currents cannot influence one another, so that, when the two fault-current tripping circuits are combined, the characteristic data for the individual fault-current tripping circuits, i.e., the rated fault current and the tripping delay for the types of fault current respectively associated with them, remain unchanged even in the combination.

A first decoupling circuit is may be connected between the first fault-current tripping circuit and the release.

In particular, a capacitor is provided for the tripping delay in the first fault-current tripping circuit.

In a further advantageous embodiment of the present invention, the first decoupling circuit comprises a diode by means of which the first fault-current tripping circuit is connected to the release. In consequence, when any current flows in the release circuit, this prevents charging of the capacitor which is provided in the first fault-current tripping circuit in order to delay tripping. In consequence, there is no undesirable tripping delay for the second fault-current tripping circuit.

In particular, the first decoupling circuit comprises a discharge resistor which is connected in parallel with the capacitor, upstream of the diode. This ensures that the capacitor is discharged completely.

A Schottky diode, which has a particularly low threshold voltage, is may be provided as the diode.

In a further preferred embodiment, a threshold-value switch is provided in the first decoupling circuit, which likewise prevents the capacitor in the first fault-current tripping circuit from being charged when the second fault-current tripping circuit responds.

In one particularly advantageous embodiment of the present invention, a second fault-current tripping circuit is provided, whose tripping is likewise delayed, with second means being provided for electronic decoupling of the second fault-current tripping circuit from the control line. This additional electronic decoupling ensures that tripping times and tripping currents cannot influence one another even when the tripping of both fault-current tripping circuits is delayed.

DETAILED DESCRIPTION

Figure 1:
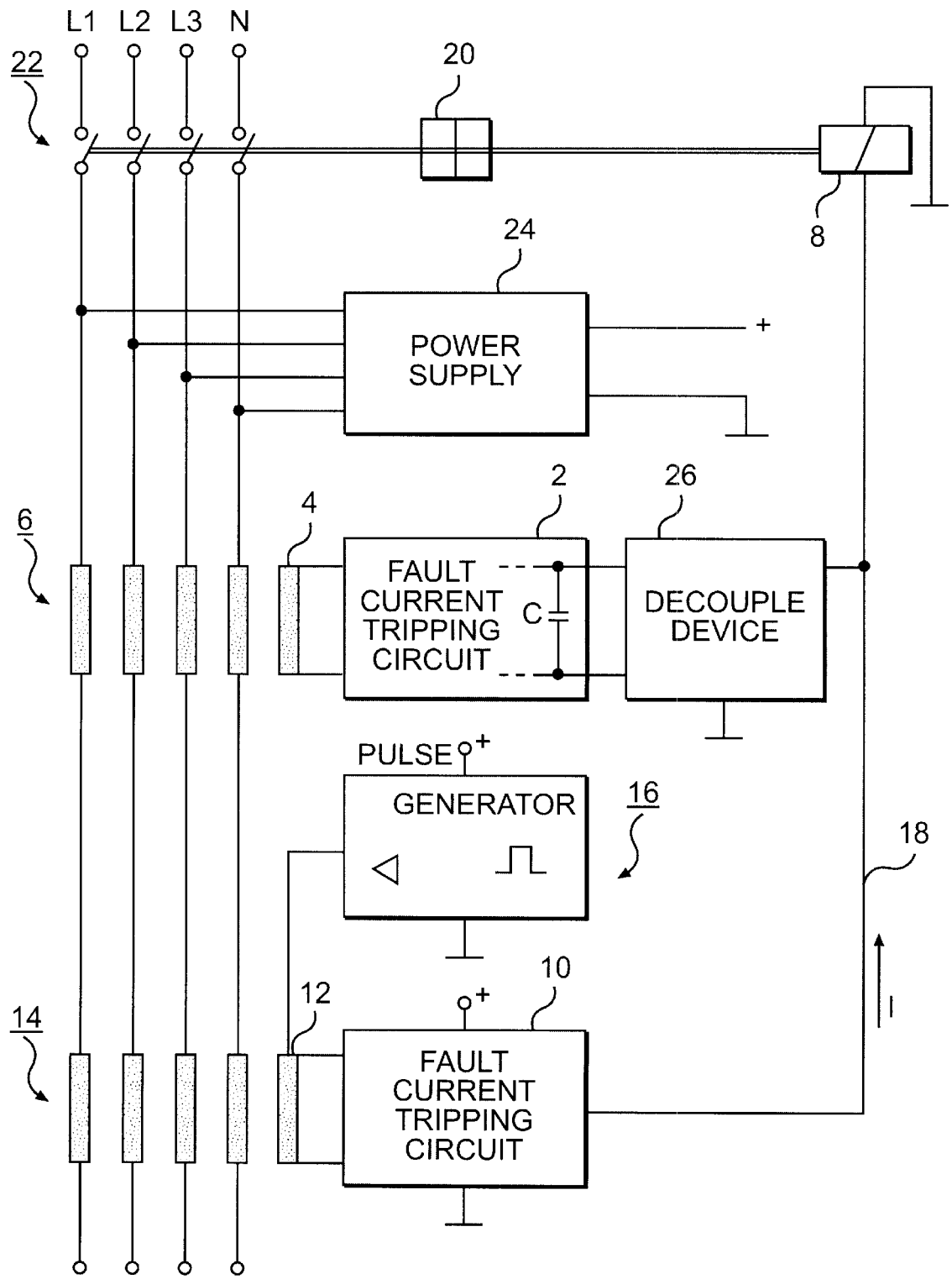
FIG. 1 shows an outline sketch of the circuit of a residual current device according to the present invention.

As shown in FIG. 1, an all-current-sensitive residual current device includes a first fault-current tripping circuit 2, which is connected to the secondary winding 4 of a first core-balance current transformer 6. The first core-balance current transformer 6 is used to monitor a polyphase network L1, L2, L3, N for alternating and pulsed fault current.

The first fault-current tripping circuit 2 contains a capacitor C which is connected to earth and is used to delay the tripping of a release 8 (which is actuated by the first fault-current tripping circuit 2), for example a coil winding of a tripping relay.

A second fault-current tripping circuit 10 which is known, for example, from European Patent Specification 0 440 835 B1 is connected to the secondary winding 12 of a second core-balance current transformer 14 and is used for tripping when a direct fault current is present. The secondary winding 12 of the second core-balance current transformer 14 has a pulse generator 16 connected to it, in order to premagnetize the core-balance current transformer 14, and which is provided with a device for balancing the signal emitted from it to the secondary winding 12.

The second fault-current tripping circuit 10 operates the release 8 via a control line 18, by producing the tripping current I required to trip it. The release 8 is operatively connected to a switching mechanism 20, by means of which a circuit breaker 22 can be tripped.

A power supply unit 24 is used to supply voltage to the second fault-current tripping circuit 10.

A first decoupling circuit 26 is connected between the first fault-current tripping circuit 2 and the control line 18 which leads to the release 8, and this first decoupling circuit 26 prevents the first fault-current tripping circuit 2 from producing any reaction on the tripping response of the second fault-current tripping circuit 10.

Figure 2:
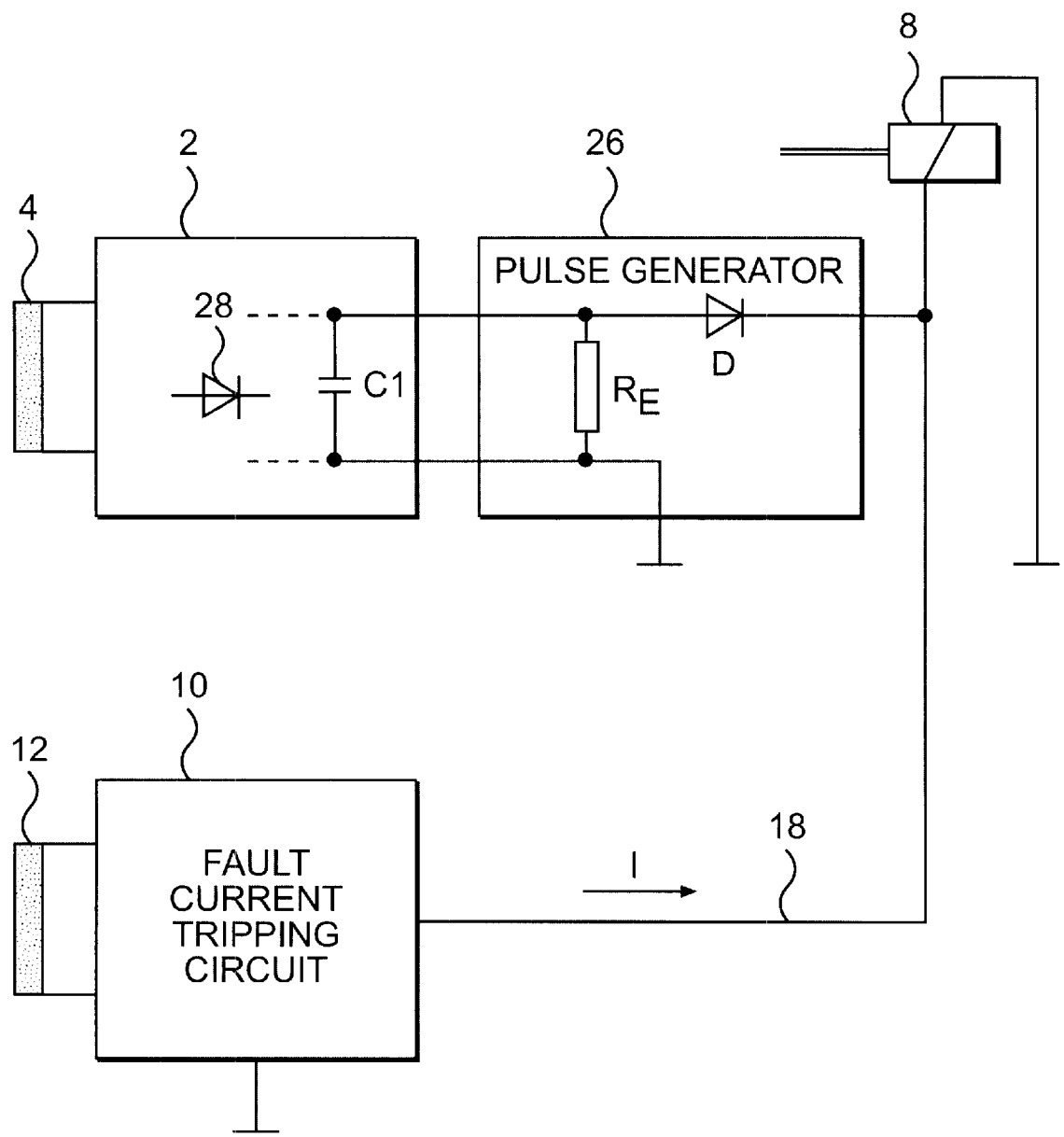
FIGS. 2 and 3 show advantageous embodiments of a first decoupling circuit provided in the residual current device according to the present invention.

As shown in to FIG. 2, the first decoupling circuit 26 for this purpose contains a diode D, which is connected in series with the output of the first fault-current tripping circuit 2, which is used to prevent the tripping current I (which flows on the control line 18 when the second fault-current tripping circuit trips) leading to charging of the capacitor C1 which is connected to earth in the first fault-current tripping circuit 2. Such charging would result in the tripping of the release 8 being delayed when the second fault-current tripping circuit 10 responds, when the second fault-current tripping circuit 10 is operated in conjunction with the first fault-current tripping circuit 2, but without the interposition of a first decoupling circuit 26.

A high-value discharge resistor $R_E$ is connected to earth upstream of the diode D, thus ensuring that the capacitor C1 is discharged below the threshold voltage of the diode D, and that the initial conditions are reproduced. A Schottky diode having a low threshold voltage, and thus a low power loss, is provided, in particular, as the diode D.

Diodes having a low threshold voltage, likewise in particular, Schottky diodes, are preferably also provided in a rectifier 28 in the first fault-current tripping circuit 2, in order to reduce the loss that occurs through the diode D and, despite the connection of the diode D, to allow the tripping current I (which is required to trip the release 8) to flow through the release 8.

Figure 3:
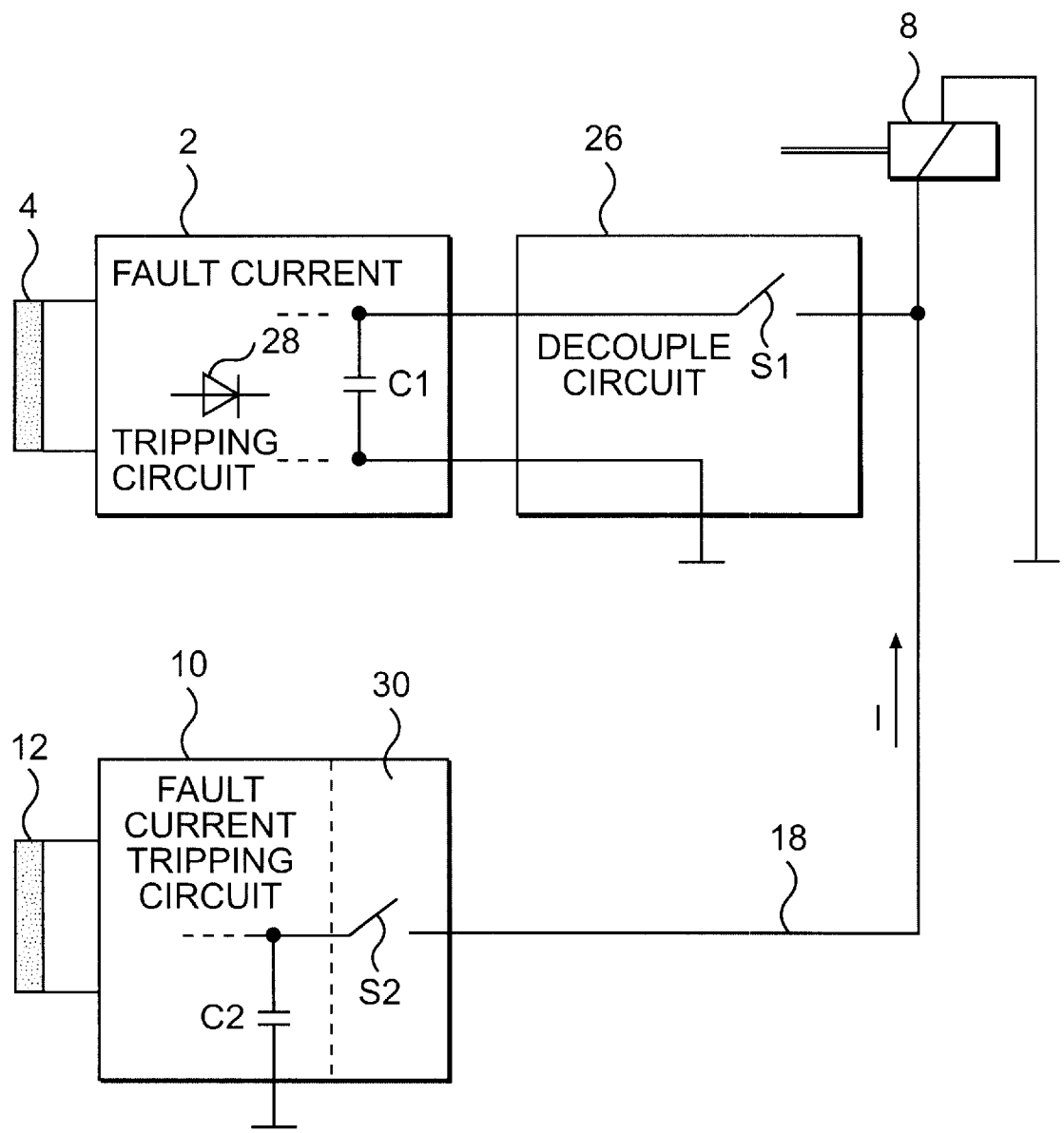

In the embodiment shown in FIG. 3, the first decoupling circuit 26 contains a threshold-value switch S1 instead of the diode D (FIG. 2), and this threshold-value switch S1 opens if the first fault-current tripping circuit 2 fails to respond. This prevents the tripping response of the second fault-current tripping circuit 10 from being influenced by the connection of the first fault-current tripping circuit 2.

The tripping of the second fault-current tripping circuit 10 is preferably likewise delayed and, to produce this tripping delay, this circuit contains a capacitor C2 connected to earth and, in this case in particular, is connected to the control line 18 via a second decoupling circuit 30, a threshold-value switch S2 in the exemplary embodiment. This also prevents the tripping response of the first fault-current tripping circuit 2 from being influenced by the presence of the second fault-current tripping circuit 2.

What is claimed is:

1. A residual current device, comprising:
   a first fault-current tripping circuit for alternating and pulsed fault current;
   a capacitor arranged on an output side of the first fault-current tripping circuit, the capacitor delaying a tripping by the first fault-current tripping device;
   a second fault-current tripping circuit for direct fault current, the first fault-current tripping circuit and the second fault-current tripping circuit being connected, in parallel with one another, to a control line of a release for a circuit breaker; and
   a first decoupling device electronically decoupling the first fault-current tripping circuit from the control line so that tripping times and tripping currents of the first fault-current tripping circuit and the second fault-current tripping circuit do not influence one another.

2. The residual current device according to claim 1, wherein the first fault-current tripping circuit includes a diode connecting the first fault-current tripping circuit to the release.

3. The residual current device according claim 2, wherein the first decoupling device includes a discharge resistor which is connected in parallel with the capacitor and upstream from the diode.

4. The residual current device according to claim 2, wherein the diode is a Schottky diode.

5. The residual current device according to claim 1, wherein the first decoupling circuit includes a threshold-value switch.

6. The residual current device according to claim 1, wherein the second fault-current tripping device has a time delay, the residual current device further comprising:
 a second decoupling device electronically decoupling the second fault-current tripping device from the control line.

7. The residual current device of claim 1, wherein the first fault-current tripping circuit includes a fault-current (FI) circuit breaker.

8. The residual current device of claim 7, wherein the first fault-current tripping circuit trips based upon either alternating or pulsed fault current.

9. The residual current device of claim 7, wherein a trip function of the first fault-current tripping circuit is independent of line voltage.

10. The residual current device of claim 7, wherein the second fault-current tripping circuit includes a differential-current (DI) circuit breaker.

11. The residual current device of claim 10, wherein a trip function of the first fault-current tripping circuit is independent of line voltage.

12. The residual current device of claim 11, wherein a trip function of the second fault-current tripping circuit is dependent upon line voltage.

13. The residual current device of claim 1, wherein the second fault-current tripping circuit includes a differential-current (DI) circuit breaker.

14. The residual current device of claim 13, wherein a trip function of the second fault-current tripping circuit is dependent upon line voltage.

15. The residual current device of claim 1, wherein the first fault-current tripping circuit trips based upon either alternating or pulsed fault current.

16. The residual current device of claim 1, wherein a trip function of the first fault-current tripping circuit is independent of line voltage.

17. The residual current device of claim 16, wherein a trip function of the second fault-current tripping circuit is dependent upon line voltage.

18. The residual current device of claim 1, wherein a trip function of the second fault-current tripping circuit is dependent upon line voltage.

* * * * *